United States Patent

[11] 3,583,427

| [72] | Inventor | Hubert Taulier<br>Yvelines, France |
|---|---|---|
| [21] | Appl. No. | 783,256 |
| [22] | Filed | Dec. 12, 1968 |
| [45] | Patented | June 8, 1971 |
| [73] | Assignee | Electricite De France Service National<br>Paris, France |
| [32] | Priority | Dec. 27, 1967 |
| [33] | | France |
| [31] | | 133865 |

[54] GAS COCK
5 Claims, 2 Drawing Figs.
[52] U.S. Cl. ................................................... 137/329.01,
137/557, 251/285, 251/288, 251/334
[51] Int. Cl. ............................................. F16k 37/00,
F16k 43/00
[50] Field of Search ............................................ 137/329,
329.01—329.06, 329.1—329.4, 557; 251/284,
285, 288, 333, 334, 367, DIG. 1

[56] References Cited
UNITED STATES PATENTS

| 2,935,292 | 5/1960 | Williamson | 251/367X |
| 3,075,541 | 1/1963 | Hajek | 137/329.01 |
| 3,202,178 | 8/1965 | Wolfe | 251/DIG. 1 UX |

*Primary Examiner*—William F. O'Dea
*Assistant Examiner*—David R. Matthews
*Attorney*—Stevens, Davis, Miller and Mosher

ABSTRACT: In a gas cock of the kind that has two coaxial-bores of different diameter communicating respectively with an inlet and an outlet and a piston slidable into the smaller diameter bore to interrupt communication between the bores, the piston is provided with a plurality of sealing rings and can be advanced into the bore by distances determined by adjustable stop means to allow first one sealing ring and then another to engage the wall of the smaller diameter bore and as the rings become worn.

PATENTED JUN 8 1971

3,583,427

INVENTOR
HUBERT TAULLIER

BY STEVENS, DAVIES, MILLER & MOSHER
ATTORNEYS

GAS COCK

This invention relates to gas cocks for use in systems requiring a perfect seal although operating with a comparatively small flow, such as, for example, systems used in the measurement of gas pressure.

It has previously been proposed to provide gas cocks, in which closure is effected by sealing a smaller diameter bore from a larger diameter bore, the two bores being coaxial, by causing a piston fitted with a sealing ring to enter the smaller bore from the larger diameter one, but the sealing ring has to be replaced, which necessitates stripping down the cock, relatively frequently if the desired perfect seal is to be achieved.

It is an object of the invention to increase the period during which the cock can be operated without having to strip it down to replace the aforesaid sealing ring.

The invention provides a gas cock of the kind which comprises a body portion formed with an inlet and an outlet and with two coaxial bores of different diameters, the inlet being in communication with one of the bores and the outlet being in communication with the other bore, a piston located in the larger diameter bore, sealing means whereby a seal is formed between the piston and the body portion, a second piston slideable into the smaller diameter bore and secured against axial movement relative to the first-mentioned piston, a sealing ring mounted on the second piston and capable of forming a a seal between the second piston and the wall of the smaller diameter bore and so seal the inlet from the outlet, and screw means whereby the first-mentioned piston can be moved axially in each direction, characterized by the improvement comprising the provision of at least one additional sealing ring on the second piston, and stop means limiting movement of the first-mentioned piston towards the smaller diameter bore, the stop means being adjustable to allow different ones of the sealing rings to come into sealing engagement with the wall of the smaller diameter bore.

Initially, the stop means is set to allow only the first sealing ring, that is to say, the sealing ring furthest from the first-mentioned piston, to engage with the wall of the smaller diameter bore. When failure to achieve the desired quality of seal indicates wear in he first sealing ring, however, the stop means is adjusted to allow the second sealing ring to come into operation, thereby delaying the need to strip down the cock to replace a sealing ring.

Advantageously, the screw means comprises a member in screw-threaded engagement with the body portion, the member being coaxial with the first-mentioned piston and so secured to the first-mentioned piston as substantially to prevent relative axial movement between the member and the first-mentioned piston, while permitting relative rotation between the member and the first-mentioned piston about their common axis. The rotatable connection between the screw-threaded member and the first-mentioned piston tends to reduce wear on the said sealing means by reducing or preventing rotation of the first-mentioned piston. Similarly, the second piston is advantageously so secured to the first-mentioned piston as to permit relative rotation between the pistons about their common axis. In each case, the rotatable connection is advantageously effected by antifriction bearing means.

ι The adjustable stop means advantageously comprises a stop member, for example, a split ring, so mounted on the screw-threaded member as to permit adjustment of its axial position relative to the screw-threaded member and arranged to abut the body portion on a member secured thereto to limit movement of the screw-threaded member towards the smaller diameter bore.

Advantageously, the said sealing means comprises a plurality of sealing rings mounted on he first-mentioned piston. Preferably, over at least a part of its length between two adjacent sealing rings, the first-mentioned piston is of reduced diameter to form, together with the wall of the larger diameter bore, a chamber of annular cross section and there is provided conduit means arranged to provide communication between the chamber and the exterior of the body portion, valve means for closing the conduit means and a resilient sleeve surrounding the body portion and covering the outer end of the conduit means, the arrangement being such that, when the valve means is open, leakage of gas into the chamber causes visible deformation of the sleeve in the region of the outer end of the conduit means. Initially, the valve means is open but, when deformation of the sleeve indicates leakage of gas past the sealing ring that forms the end of the chamber towards the smaller diameter bore, the valve is closed to bring into use the sealing ring that forms the other end of the chamber and which had previously not been exposed to the full gas pressure. Preferably, the conduit means comprises a bore of which a portion at or towards its inner end is screw-threaded and is of reduced diameter to form a shoulder, and the valve means comprises a screw member in screw-threaded engagement with the threaded portion of the bore and having a head arranged to seat through a sealing washer on the shoulder.

The sealing rings mounted on the smaller diameter piston, and/or any sealing rings that form the sealing means between the larger diameter piston and the wall of the bore are preferably formed of a synthetic material.

Two forms of gas cock constructed in accordance with the invention will now be described by way of example with reference to the accompanying drawings, in which.

Figure 1:
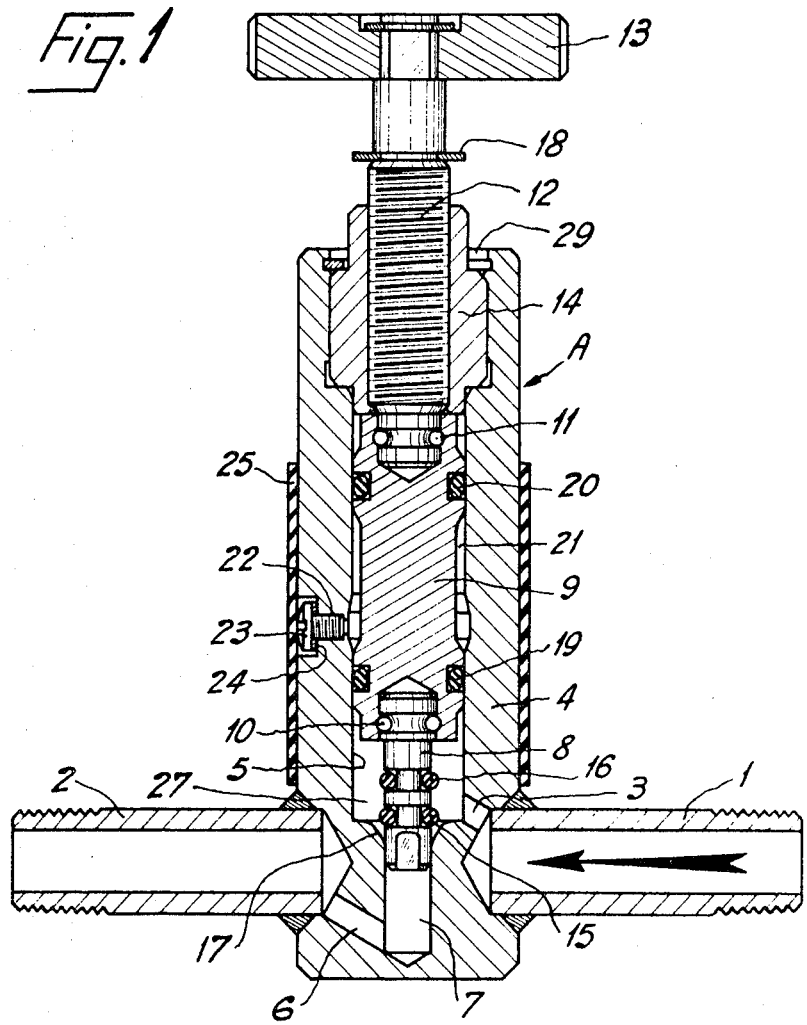
FIG. 1 is an axial cross section of the first form of gas cock.

Referring to FIG. 1 of the accompanying drawings, the first form of gas cock, which is indicated generally by the reference letter A, is used to permit or interrupt the flow of gas between two ducts 1 and 2, which enter inlet and outlet openings in the cock.

By means of a duct 3 provided in the body member 4 of the cock A, the duct 1 is connected to a chamber 27 formed by a large diameter bore 5. Similarly, the duct 2 communicates through a duct 6 with the lower part of a small diameter bore formed in he body member 4.

In the small diameter bore 7, there is a small piston 8, which is connected to a large piston 9 which slides in the large diameter bore 5. For the purpose of assembly, the small piston enters a recess provided in the large piston and is fixed therein by a ball bearing of which the balls are shown at 10. The balls 10 are placed in position through a bore (not shown) which is subsequently blocked.

By means of a similar antifriction bearing incorporating balls 11, the large piston 9 is connected to a threaded rod 12, which is provided with a knob 13 and engages an internally screw-threaded member 14, which is releasably secured in the body member 4 and completes the body portion of the cock. The bearing assemblies enable rotation of the rod 12 to take place without making the pistons 8 and 9 rotates.

The small piston 8 is provided with two sealing rings 15 and 16 which are identical with one another and arranged in two grooves formed in the small piston. The small diameter bore 7 is formed with a tapered entrance 17 having rounded edges so enabling these sealing rings to engage the wall of the said bore with the minimum risk of wear.

The rod 12 is provided with an adjustable stop ring 18 which can be adjusted to permit only the first or lower sealing ring 15 to engage the bore 7, in order to prevent the passage of gas between the two ducts 1 and 2 when the knob 13 is operated to close the cock.

Notwithstanding the precautions hereinbefore described, it will eventually happen that the ring 15 deteriorates at its periphery and can no longer provide a satisfactory seal. This becomes noticeable when, during the cleaning of the duct 2, a gas pressure is observed in the duct 2 while the cock is shut, if the gas is flowing in the sense indicated by the arrow.

In order to render the cock usable again, the stop 18 is removed or displaced towards the knob 13 along the rod 12 along a rather large distance. In this way the rod 12 can be screwed in further and, consequently, the second sealing ring 16 can engage the small bore 7. Since the sealing ring 16 is practically new, having not previously entered the bore 7, the cock is rendered usable again. In this way it becomes possible to postpone its repair, for example, until it becomes necessary to clean and overhaul the installation completely.

In order to minimize leakages to the exterior, the large piston is provided with two sealing rings 19 and 20 which define a chamber 21 of annular cross secton inside the body member 4. Conduit means in the form of an aperture 22 allows the chamber 21 to communicate with the outside. This aperture is closable by means of a screw 23 having a sealing washer 24, and this screw is not initially tightened onto its seat. The body member 4 of the cock is surrounded by an elastic sleeve 25 covering the screw 23.

In normal operation the ring 19 itself provides a seal between the large piston and the wall of the large bore 5. This ring may be fixed more tightly than the second ring 20 which serves as a standby ring.

Since, in operation, the ring 19 is subjected to the total pressure of the gas whose flow is controlled by the cock, and also possibly owing to its tighter mounting, this ring tends to wear more rapidly than the ring 20 as a result of the motion of the two piston 8 and 9.

When the ring 19 becomes worn, gas under pressure enters the annular chamber 21 and, through the aperture containing the incompletely tightened screw 23, inflates, and can even burst, the sleeve 25. When this happens, the screw 23 is tightened fully and the ring 20 becomes operative so as to maintain the pressure seal between the large piston 9 and the wall of the large bore 5. It is possible, moreover, for example by checking with soapy water in a region indicated by the reference numeral 29 at the top of the body member 4, to determine whether the packing ring 20 is in fact working efficiently. If this check proves satisfactory, the cock will remain usable for a further period of time.

Figure 2:
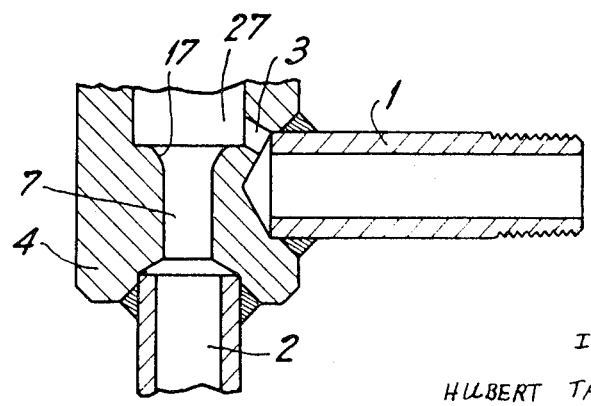
FIG. 2 is an axial cross section of the lower part of a modified form of gas cock.

Referring to FIG. 2 of the accompanying drawings, the modified form of gas cock is similar to that shown in FIG. 1, except that the duct 2 begins directly at the lowest point of the small diameter bore 7 and is coaxial with the said bore.

I claim:

1. In a gas cock of the kind which comprises a body portion formed with an inlet and an outlet and with two coaxial bores of different diameters, the inlet being in communication with one of the bores and the outlet being in communication with the other bore, a piston located in the larger diameter bore, sealing means whereby a seal is formed between the piston and the body portion, a second piston slideable into the smaller diameter bore and secured against axial movement relative to the first-mentioned piston, a sealing ring mounted on the second piston and capable of forming a seal between the second piston and the wall of the smaller diameter bore and so seal the inlet from the outlet and screw means whereby the first-mentioned piston can be moved axially in each direction, the improvement comprising the provision of at least one additional sealing ring on the second piston, and stop means limiting movement of the first-mentioned piston towards the smaller diameter bore, the stop means being adjustable to allow different ones of the sealing rings to come into sealing engagement with the walls of the smaller diameter bore.

2. A gas cock according to claim 1, wherein the screw means comprises a screw-threaded member in screw-threaded engagement with the body portion and coaxial with the first-mentioned piston and connecting means connecting the screw member to the first-mentioned piston while permitting relative rotation between the member and the first-mentioned piston about their common axis.

3. A gas cock according to claim 2, wherein the adjustable stop means comprises an axially adjustable stop member mounted on the screw-threaded member and arranged to abut the body portion or a member secured thereto to limit movement of the screw-threaded member towards the smaller diameter bore.

4. A gas cock according to claim 1, wherein the sealing means comprises a plurality of sealing rings mounted on the first-mentioned piston, the said piston, over at least a part of its length between two adjacent sealing rings, is of reduced diameter forming, together with the wall of the larger diameter bore, a chamber of annular cross section, and the body portion is formed with conduit means, providing communication between the said chamber and the exterior of the body portion, and there is provided valve means for controlling the flow of gas through the conduit means, and a resilient leakage-indicating sleeve surrounding the body portion and covering the outer end of the conduit means.

5. A gas cock according to claim 4, wherein the conduit means comprises a bore having an inner screw-threaded engagement with the threaded portion of the bore, a sealing washer mounted on the screw member and a head formed on the screw member and arranged to seat on the said shoulder through said sealing washer.